United States Patent [19]

Namba et al.

[11] 4,038,624
[45] July 26, 1977

[54] ROTARY TRANSFORMER

[75] Inventors: Masanao Namba; Masateru Kuniyoshi; Akira Kobayashi, all of Yokohama, Japan

[73] Assignee: Tokyo Shibaura Electric Co., Ltd., Kawasaki, Japan

[21] Appl. No.: 617,245

[22] Filed: Sept. 26, 1975

Related U.S. Application Data

[63] Continuation-in-part of Ser. No. 480,385, June 18, 1974, abandoned.

[30] Foreign Application Priority Data

June 26, 1973 Japan .............................. 48-75958[U]

[51] Int. Cl.$^2$ .................. H01F 27/08; H01F 27/24
[52] U.S. Cl. ....................................... 336/60; 336/120; 336/210; 336/234
[58] Field of Search ................ 336/60, 61, 210, 119, 336/120, 234; 310/42, 217, 218, 254, 61, 60 R

[56] References Cited

U.S. PATENT DOCUMENTS

| | | | |
|---|---|---|---|
| 639,505 | 12/1899 | Berry | 336/60 X |
| 682,520 | 9/1901 | Berry | 336/60 |
| 781,957 | 2/1905 | Kishi | 310/218 |
| 1,030,095 | 6/1912 | Knight | 310/217 X |
| 1,539,662 | 5/1925 | Frei | 310/217 X |
| 2,516,140 | 7/1950 | Nahmon | 310/217 X |
| 2,997,567 | 8/1961 | Connelly | 336/234 X |
| 3,317,874 | 5/1967 | Honsinger | 336/120 |
| 3,502,914 | 3/1970 | Cox | 310/217 X |
| 3,513,342 | 5/1970 | Saber | 310/61 X |
| 3,814,963 | 6/1974 | Laing | 310/254 X |

FOREIGN PATENT DOCUMENTS

| 642,966 | 7/1962 | Italy | 310/217 |
|---|---|---|---|

Primary Examiner—Thomas J. Kozma
Attorney, Agent, or Firm—Oblon, Fisher, Spivak, McClelland & Maier

[57] ABSTRACT

A rotary transformer includes rotor and stator cores arranged apart from each other. The rotor core is made of a plurality of U-shaped core plates which are laminated around a rotary shaft and supported by a pair of plates engaged with the opposite side ends of the rotor core and by an insulative band winding the bottom of the annular recess for receiving a rotor coil.

9 Claims, 6 Drawing Figures

ROTARY TRANSFORMER

CROSS-REFERENCE TO RELATED APPLICATION

This application is a continuation-in-part of our copending Ser. No. 480,385, now abandoned, filed June 18, 1974, and assigned to the same assignee as the present invention.

BACKGROUND OF THE INVENTION

This invention relates to a rotary transformer comprising a rotary shaft, a rotor core secured on the rotary shaft, a rotor coil wound about the rotor core, a stator core surrounding the rotor core with an airgap and a stator coil mounted on the stator core, whereby the rotary shaft is rotated to effect transforming with the rotor and stator coils respectively as primary and secondary windings.

Generally a rotary transformer of this type is used as brushless exciter to a thyristor motor or a synchronous motor.

In a conventional rotary transformer of this kind, the rotor core mounted on the rotary shaft includes a cylindrical axial core concentric with the rotary shaft and two radial cores jointed to the opposite ends of the axial core and formed of a number of circular core plates laminated along the axis of the rotary shaft. The stator core of the transformer is constituted by an axial core and radial cores both being formed in the same manner as those of the rotor core. In this device the jointed portions between the cylindrical axial core and the radial cores cause thin air spaces. As a result, a magnetic flux is disturbed at the air gaps whereby its distribution is much confused. To compensate the confusion of magnetic flux distribution, both the rotor and stator cores should have each a coil of an increased number of turns. This means an increase in excitation ampere-turns and a decrease in power-factor of the transformer.

A rotary transformer of another type is known to prevent such a power-factor drop. Its rotor and stator cores are each comprised of a number of U-shaped core plates which are laminated to form a thick cylinder concentrically surrounding the rotary shaft. The transformer is, however, defective in that the attachment of the U-shaped core plates to the rotary shaft to form a rotor core is accompanied with great difficulties, and the core plates can not be so firmly fixed to the shaft as to promise a mechanically strong coreshaft joint.

SUMMARY OF THE INVENTION

Accordingly, the first object of this invention is to provide a rotary transformer very strong mechanically. The second object is to set free the transformer from pulsating magnetic resistance accompanying with the positional changes of the rotor. The third object is to enhance the cooling efficiency of the rotor. The fourth object is to make it easy to assemble the rotary transformer.

To achieve the second object, the stator core is so assembled that the inner periphery at its both ends (leg portions) is made smooth and continuous. That is, the passage of a magnetic flux is a perfectly cylindrical wall.

To attain the third object, wedges are driven partly into spaces among iron blocks forming the rotor core so that the partly unfilled spaces define air passages extending along the rotor shaft. Through these air passages air flows so as to cool both the rotor core and the rotor coil. The wedges serve also to combine firmly the rotor iron blocks together into a mechanically strong rotor core. To strengthen the rotor core further, an insulative band is wound about the rotor core, pushing the wedges in the spaces in the radial direction of the rotor.

To achieve the fourth object, the rotor core is constituted by iron blocks each of which is made of laminated thin iron plates and has a rectangular cross section, which are fixed to the periphery of the rotor shaft and extend in radial direction, any adjacent two of which define an equal angle. The stator core is constituted in the same manner as the rotor core except that its iron blocks are fixed to the inner wall of a cylindrical housing.

DETAILED DESCRIPTION OF THE PREFERRED EMBODIMENTS

Figure 1:
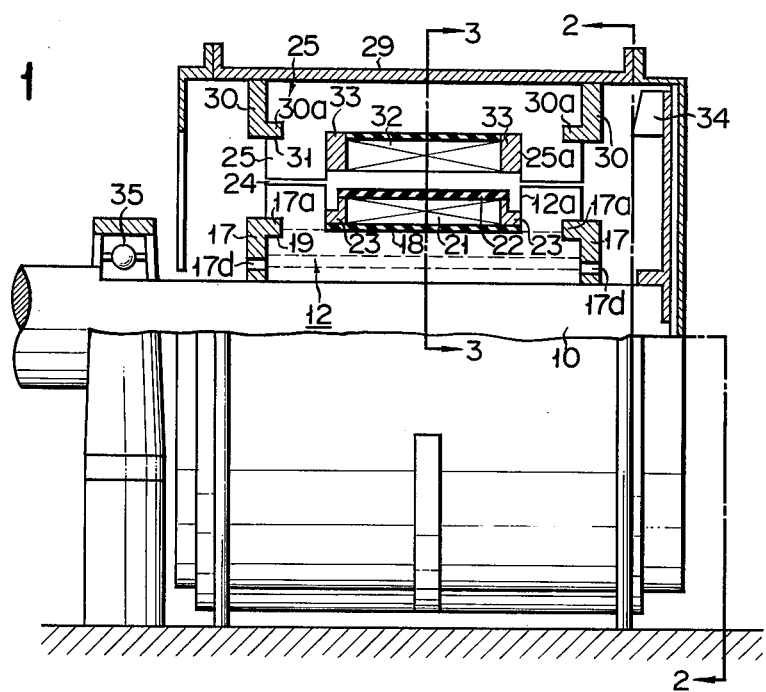
FIG. 1 is a partially cross-sectional side view of the rotary transformer according to one embodiment of this invention.
Figure 2:
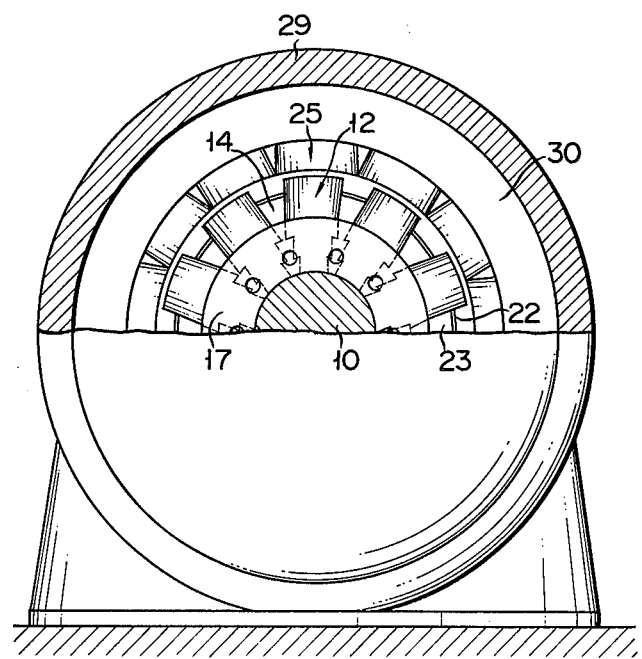
FIG. 2 is a cross-sectional view of the rotary transformer shown in FIG. 1 taken along line 2—2.
Figure 3:
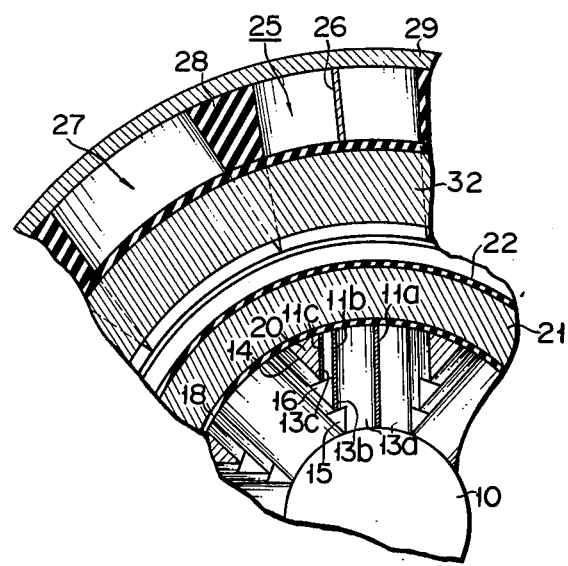
FIG. 3 is another cross-sectional view of the transformer shown in FIG. 1 taken along line 3—3.

The rotary transformer according to one embodiment of the present invention will now be described with reference to FIGS. 1 to 3.

On a rotary shaft 10 of the rotary transformer a doughnut-shaped rotor core 12 is secured. The rotor core 12 is constituted by a number of substantially U-shaped core plates which are laminated around the rotary shaft 10. As illustrated in FIG. 3, these core plates are insulated iron plates divided into some groups, in this embodiment into three groups 11a, 11b and 11c. The insulated iron plates of each group have breadth different from those of the other groups, and laminated together with a bonding agent into blocks of the same size. Thus, three groups of blocks 13a, 13b and 13c of different breadths are formed in this embodiment. These blocks of three kinds are assembled into the rotor core 12 in the following manner.

The paired blocks 13a made of the broadest insulated iron plates 11a are securely sandwiched with two blocks 13b of the second broadest insulated iron plates 11b. The blocks 13b attached to the blocks 13a are fixedly sandwiched with the blocks 13c of the narrowest insulated iron plates 11c. The assemblies each constructed by blocks 13a, 13b, 13c are jointed with each other and arranged into a cylinder enclosing the periphery of the shaft. The blocks 13a, 13b and 13c are so bundled together that their outer peripheries define an arc of a circle and only the blocks 13a touch the rotary shaft 10 at the inner periphery. Consequently the facing narrowest blocks 13c of any adjacent two block assemblies define a space 14 of V-shaped cross section. Similarly the corresponding second broadest blocks 13b and the broadest blocks 13a of any adjacent two block assemblies define air passages 15 and 16 of triangular cross section, respectively. Into the V-shaped spaces 14 under a rotor coil 21 wedges 20 are fixedly inserted to prevent any possible relative movement of the block assemblies in a peripheral direction of the rotor core 12 and any possible movement of the rotor core with respect to the rotary shaft 10. Each wedge 20 is made shorter than said rotor core 12 leaving void spaces at the ends of the V-shaped space 14.

The rotor core 12 would loose off the rotary shaft 10 due to the centrifugal force exerted on it while it rotates. To avoid this, a pair of support plates 17 are engaged with the rotor core 12 and an insulative band 18 is wound about the rotary core 12 to tighten up the same. The support plates 17 are provided with a plurality of holes 17d which are communicated with the air spaces 15, 16.

In each end face of the rotor core 12 an annular groove 19 is made. The annular groove 19 can easily be formed by providing a rectangular notch at both ends of the substantially U-shaped insulated iron plates 11a, 11b and 11c. Each of the above-mentioned support plates 17 is a disc whose center is bored with an opening for insertion of the rotor core 12 and has an annular protrusion 17a formed at the peripheral edge engaging the annular groove 19 of the rotor core 12. The support plates 17 are securely attached to the rotor core 12 by any well-known means, for example, a bonding agent or welding. Of course, such means may be applied also to joint the support plates 17 to the rotor core 12. The aforementioned insulative band 18 may be formed by winding a well-known insulating adhesive tape several times on the bottom of the channel-recess 12a formed in the outer periphery of the rotor core 12.

In the channel-recess 12a, a conventional rotor coil 21 is placed on the insulative band 18 to be concentric with the rotary shaft 10. On the outer periphery of the rotor coil 21 an insulative band 22 is provided so as to secure the coil 21 onto the rotor core 12 in the radial direction. Spacers 23 are inserted between the walls of the rotor core 12 and the end faces of the rotor coil 21, thereby preventing the coil 21 from the moving along the rotary shaft 10.

A stator core 25 surrounds the rotor core 12 with an airgap 24 to be concentric therewith. The stator core 25 comprises blocks 27 equally interspaced on an imaginary circle concentric with the rotary shaft 10 and wedges 28 each driven between the adjacent blocks 27 all bonded together with an adhesive agent. The block 27 is constituted by a number of insulated core plates 26 which are substantially identical in shape and size with the U-shaped core plates 11a forming the rotor core 12. The stator core 25 is secured to the inner periphery of a housing 29 with its outer periphery fixed thereto. The blocks 27 are arranged so that the inner ends of adjacent ones contact each other thereby forming the stator core 25 having a continuous inner periphery. To secure the stator core 25 to the housing 29 more firmly, a pair of ring-shaped support plates 30 each having an annular protrusion 30a are provided. The support plates 30 are fixed to the housing 29 and clamp the stator core 25 with the annular protrusions 30a engaged with annular grooves 31 each formed in the end face of the stator core 25 in the same manner as the annular groove 19 of the rotor core 12. Between the stator core 25 and the support plates 30a bonding agent may be applied.

In the channel-shaped recess 25a formed in the inner periphery of the stator core 25, a stator coil 32 is placed to concentrically surround the rotor coil 21 with a predetermined space. Between the end faces of the coil 32 and the walls of the recess 25a spaces 33 are disposed to secure the stator coil 32 onto the stator core 25.

Within the housing 29, a fan 34 is provided to introduce cooling air from the outside. The rotary shaft 10 is rotatably supported by a ball bearing 35 positioned outside the housing 29. Then the rotor of this rotary transformer is overhung.

In the above-described embodiment, as in a conventional rotary transformer, when the rotary shaft 10 is rotated and the stator coil 32 is excited with an alternating current, an induced voltage is produced by transformer operation in the rotating rotor coil 21 mounted on the rotary shaft 10. The voltage induced in the rotor coil 21 is determined solely by the turn ratio between rotor coil 21 and the stator coil 32 irrespective of the speed of revolution of the rotor. This is because the stator core 25 has a smooth and continuous periphery, so that the magnetic reluctance between them does not vary regardless of the angular position of the rotor. Consequently it becomes possible to impress a specific voltage on the rotor without using any brush.

In the aforementioned embodiment, the rotor core 12 has end faces with annular grooves 19 in which the protrusions 17a of the support plates 17 are securely inserted. Since the support plates 17 are secured to the rotary shaft 10 with their central openings penetrated by the rotary shaft 10 and never move in the radial direction, the insulated core plates 11a, 11b and 11c are prevented unfailingly from moving in the radial direction of the rotary shaft 10. The insulated core plates 11a can further be prevented from moving in the radial direction by the insulative band 18 wound on the recess 12a of the rotor core 12 and by the insulative band 22 wound on the outer periphery of the rotor coil 21. Moreover, the core plates of both the rotor core 12 and the stator core 25 never move in the rotary direction of the rotary shaft 10 since a wedge is driven between any adjacent two of the core plate block assemblies which constitute the rotor core 12 and the stator core 25. Still further, between the adjacent two core plate assemblies two triangular air passages 15 and 16 are formed and serve to prevent an excessive heating of the rotor core 12.

Figure 4:
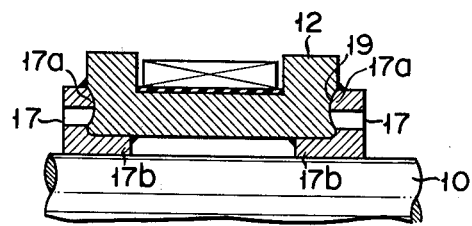
FIGS. 4, 5 and 6 are cross-sectional views of the rotary cores of the rotary transformer according to different embodiment of this invention.

FIG. 4 shows another embodiment of this invention, in which annular grooves 19 formed in the end faces of the rotor core 12 have a V-cross section and the protrusions 17a of doughnut-shaped support plates 17 have also a V-cross section and are engaged with the annular grooves 19, thereby prohibiting the rotor core 12 from moving in the radial direction. In this embodiment, the support plates 17 have each another protrusion 17b. The rotor core 12 is not directly attached to the rotary shaft 10 but to the support plates 17 with its end faces and inner periphery welded to the protrusions 17a and the protrusions 17b, respectively. Alternately, the inner periphery of the rotor core 12 may be welded directly to the rotary shaft 10 where the support plates 17 are provided with no protrusion 17b.

Figure 5:
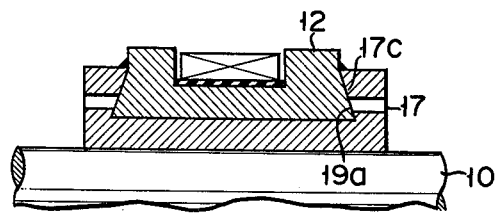

FIG. 5 shows another embodiment of this invention, wherein the engagement of the rotor core 12 and the support plate 17 is achieved by the inclined surface portions 19a of the end faces of the core 12 and the inclined inner walls 17c of the plate 17. Thus, the rotor core 12 is secured to the rotary shaft 10 through the support plate 17.

Figure 6:
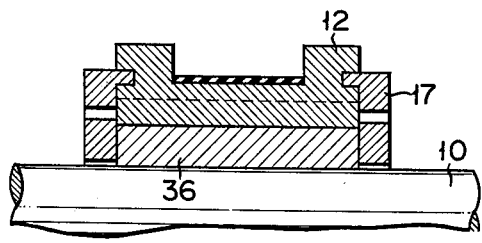

FIG. 6 shows a still another embodiment of this invention. In this embodiment, the rotor core 12 is welded concentrically to an iron sleeve 36 and the support plates 17 are welded to the end faces of the rotor core 12 and of the iron sleeve 36. The core-plate-sleeve assembly is mounted on the rotary shaft 10. Since this assembly may be easily made, the manufacture of the embodiment can be effected with an increased work efficiency.

What we claim is:

1. A rotary transformer comprising:
   a cylindrical housing;
   a stator core including a plurality of iron blocks and an annular recess therein, each block being made of U-shaped, laminated iron plates each having the same and uniform thickness and arranged on the inner wall of said housing, and any two adjacent blocks being spaced from each other for a distance at the outer edges and contacted with each other at the inner edges;
   a rotary shaft;
   a rotor core including a plurality of iron blocks and an annular recess therein, each block being made of U-shaped, laminated iron plates each having the same and uniform thickness, arranged on the periphery of said rotary shaft, and having the outer end spaced from the inner surface of said stator core;
   a stator coil disposed in the recess of said stator core;
   a rotor coil disposed in the recess of said rotor core;
   first fastening means engaging the end face of every stator iron block to thereby fix the stator iron blocks and secure the stator core to the housing; and
   second fastening means engaging the end face of every rotor iron block to thereby fix the rotor iron blocks and secure the rotor core to the rotary shaft.

2. A rotary transformer according to claim 1 which includes wedges inserted respectively in the spacings between said stator iron blocks.

3. A rotary transformer according to claim 1 which includes wedges inserted respectively in the spacings between said rotor iron blocks.

4. A rotary transformer according to claim 1 which includes wedges inserted respectively in the spacings between said stator iron blocks and in the spacings between said rotor iron blocks.

5. A rotary transformer according to claim 3 which includes an insulative tape wound around the bottom surface of the recess in the rotor core.

6. A rotary transformer according to claim 1 further comprising a sleeve disposed between said rotor core and said rotary shaft and adapted to fasten said rotary core and rotary shaft together, and wherein said second fastening means is secured to said sleeve.

7. A rotary transformer according to claim 3 wherein there are formed air passages between said rotary shaft and said wedges inserted in said rotor iron blocks to thereby cool said rotor core.

8. A rotary transformer according to claim 1 wherein said rotor core is spaced partially from said rotary shaft so that air passages are formed to cool the rotor core.

9. A rotary transformer according claim 7 wherein:
   said second fastening means is provided with a plurality of holes communicating with the air passages between said rotary shaft and said wedges inserted in said rotor iron blocks.

* * * * *